United States Patent
Lu et al.

(10) Patent No.: US 12,164,620 B2
(45) Date of Patent: Dec. 10, 2024

(54) SECURE PASSWORD ENTRY METHOD AND SYSTEM

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 114 days.

(21) Appl. No.: 17/432,078

(22) PCT Filed: Oct. 22, 2020

(86) PCT No.: PCT/CN2020/122811
§ 371 (c)(1),
(2) Date: Aug. 18, 2021

(87) PCT Pub. No.: WO2021/129095
PCT Pub. Date: Jul. 1, 2021

(65) Prior Publication Data
US 2022/0327192 A1 Oct. 13, 2022

(30) Foreign Application Priority Data
Dec. 28, 2019 (CN) .......................... 201911385177.7

(51) Int. Cl.
*H04L 29/00* (2006.01)
*G06F 21/34* (2013.01)
*G06F 21/46* (2013.01)

(52) U.S. Cl.
CPC .............. *G06F 21/34* (2013.01); *G06F 21/46* (2013.01); *G06F 2221/031* (2013.01)

(58) Field of Classification Search
CPC ..... G06F 21/34; G06F 21/46; G06F 2221/031
USPC ........................................................ 713/183
See application file for complete search history.

(56) References Cited

U.S. PATENT DOCUMENTS

| 9,590,978 | B2 * | 3/2017 | Joyce, III | G06F 21/83 |
| 2016/0269103 | A1 * | 9/2016 | Lu | H04L 63/0876 |
| 2018/0191504 | A1 * | 7/2018 | An | H04L 9/40 |

* cited by examiner

*Primary Examiner* — Jeffrey C Pwu
*Assistant Examiner* — Michael D Anderson
(74) *Attorney, Agent, or Firm* — Hammer & Associates, P.C.

(57) ABSTRACT

A method and system for safely entering a password, the method comprising: a smart key device receives a password verification request sent from an upper computer, generates and displays randomly arranged characters, and returns a password verification response to the upper computer; upon the reception of the password verification response, the upper computer displays a password input interface and waits for a user to input, upon the reception of a user input, obtains a password acquisition response according to the user input, and sends the password acquisition response to the smart key device; and the smart key device determines whether the user input is correct according to the received password acquisition response. By means of the present invention, a password input solution in which a user needs to click a different position every time a password character is entered is achieved. In addition, the numbers are not displayed on the screen of the upper computer, the security of the user's digital assets is further ensured.

18 Claims, 7 Drawing Sheets

SECURE PASSWORD ENTRY METHOD AND SYSTEM

FIELD OF THE INVENTION

The present invention relates to a method for inputting a password safely and a system therefor, which belong to a field of information security.

PRIOR ART

With development of internet business, the network interaction becomes more and more popular in people's life, thus the security in inputting a password during the network interaction becomes more popular; when it comes to a smart key device, a private key, which is isolated from the internet, is stored in a chip of the smart key device independently, and the private key is just connected with the internet when it is used, in this way, the network interaction is safer, but with the source code of the upper software is opened, the password of a hardware cannot be protected by using a traditional protection method; the hardware password may be lost in the case of the upper software source code is falsified whatever the encryption method is.

SUMMARY OF THE INVENTION

The object of the present invention is to provide a method for inputting a password safely and a system therefor, in which a user must take part in a dynamic secrete code verifying process to form a different password each time; and the input password is not shown on a screen of the upper computer, therefore, the user's digital asset become safer.

Thus, according to one aspect of the present invention, there is provided a method for inputting a password securely, wherein said method comprises the following steps:
 s1) receiving, by a smart key device, a request for verifying the password sent from an upper computer, generating and displaying characters arranged randomly, and returning a response for verifying the password to the upper computer;
 s2) receiving, by the upper computer, the response for verifying the password, displaying an interface for inputting the password, waiting for a user's inputting, and determining whether the user's inputting is received, if yes, executing step s3; otherwise, reporting an error, and ending the method;
 s3) obtaining, by the upper computer, a first location identification of corresponding location according to the user's inputting, and obtaining a response for obtaining the password according to the first location identification, and sending the response for obtaining the password to the smart key device; and
 s4) receiving, by the smart key device, the response for obtaining the password, and determining whether the user's inputting is correct according to the response for obtaining the password, a password stored by smart key device itself and characters arranged randomly, if yes, a verification is successful, the smart key device returning a successful verifying response to the upper computer; otherwise, the verification is failed, the smart key device returning a unsuccessful verifying response to the upper computer.

Preferably, before step s1, said method comprises the following steps:
 s1-1) waiting for, by the upper computer, receiving triggering information from a user, and determining whether the triggering information is received from the user, if yes, executing step s1-2, otherwise, returning to step s1-1,
 s1-2) determining, by the upper computer, whether there is the smart key device which is connected to the upper computer, if yes, executing step s1-6, otherwise, executing step s1-3,
 s1-3) sending, by the upper computer, a connecting request to the upper computer;
 s1-4) receiving, by the smart key device, the connecting request, generating a connecting response, and returning the connecting response to the upper computer;
 s1-5) receiving, by the upper computer, the connecting response, and determining whether it connects to the smart key device successfully according to the connecting response, if yes, executing step s1-6, otherwise, returning to step s1-3,
 s1-6) determining, by the upper computer, whether it matches with the smart key device successfully, if yes, executing step s1; otherwise, sending a matching request to the smart key device, and prompting the user to input a matching code, and executing step s1-7, and
 s1-7) determining, by the upper computer, whether the matching code is received from the user, if yes, determining whether the matching code is correct, generating the request for verifying the password and sending the request for verifying the password to the smart key device if the matching code is correct; prompting the matching code is incorrect and waiting for the user to input the matching code and returning to step s1-7 if the matching code is incorrect; otherwise, exiting and ending the method.

Preferably, generating and displaying characters arranged randomly in step s1 specifically is generating and displaying a random figure which includes characters shown for the user to input; or
 generating and displaying a preset figure which includes characters arranged randomly and used for the user to input; or
 generating and displaying a preset picture which includes random characters shown for the user to input.

Preferably, step s3 specifically comprises:
 obtaining, by the upper computer, the first location identification of location corresponding to the user's inputting according to the user's inputting, operating hash algorithm on the first location identification so as to obtain a first operation result, and making the first operation result as a response for obtaining the password, and sending the response for obtaining the password to the smart key device.

Preferably, step s4 specifically comprises:
 receiving, by the smart key device, the response for obtaining the password, obtaining the first operation result, obtaining a second location identification of location corresponding to the user password stored by the smart key device itself according to the user password stored by the smart key device itself and characters arranged randomly, operating hash algorithm on the second location identification so as to obtain the second operation result, and determining whether the first operation result is correct according to the second operation result, if yes, the verification is successful; otherwise, the verification is failed.

Preferably, step s3 specifically comprises
 obtaining, by the upper computer, the first location identification of location corresponding to the user's inputting according to the user's inputting, and making the first location identification as the response for obtaining the password, and sending the response for obtaining the password to the smart key device.

Preferably, step s4 specifically comprises:

receiving, by the smart key device, the response for obtaining the password, obtaining the first location identification, joining the first location identification in sequence so as to obtain the first operation result; obtaining the second location identification of location corresponding to the user password stored by the smart key device itself according to the user password stored by the smart key device itself and characters arranged randomly, joining the second location identification in sequence so as to obtain the second operation result, and determining whether the first operation result is the same as the second operation result, if yes, the verification is successful; otherwise, the verification is failed.

Preferably, step s3 specifically comprises:

obtaining, by the upper computer, the first location identification of location corresponding to the user's inputting according to the user's inputting, joining the first location identification in sequence so as to obtain the response for obtaining the password, and sending the response for obtaining the password to the smart key device.

Preferably, step s4 specifically comprises:

receiving, by the smart key device, the response for obtaining the password, dividing and intercepting each first location identification from the response for obtaining the password, confirming a password input by the user according to the first location identification, and determining whether the password input by the user is the same as the password stored by the smart key device itself, if yes, the verification is successful; otherwise, the verification is failed.

According to the other aspect of the present invention, there is provided a system for inputting a password securely, wherein said system comprises a smart key device and an upper computer;

the smart key device comprises:

a first means for receiving a request for verifying the password sent from the upper computer;

a first means for returning a response for verifying the password to the upper computer;

a first means for generating and displaying characters arranged randomly when the first means for receiving receives the request for verifying the password sent from the upper computer;

the first means for receiving a first operation result sent from the upper computer;

a first means for determining whether the user's inputting is correct according to the first operation result, a password stored by the smart key device itself, and characters arranged randomly generated by the means for generating and displaying characters in the case that the first means for receiving receives the first operation result;

the first means for returning a successful verifying response to the upper computer when the first means for determining determines that the user's inputting is correct; and return an unsuccessful verifying response to the upper computer when the first means for determining determines that the user's inputting is incorrect;

the upper computer includes:

a second means for receiving the response for verifying the password returned from the smart key device;

a second means for displaying an interface for inputting the password and waiting for a user to input the password when the second means for receiving receives the response for verifying the password;

the second means for determining whether the user's inputting is received when the second means for displaying displays the interface for inputting the password;

a second means for obtaining the first location identification of corresponding location, and operate on the first location identification so as to obtain the first operation result when the second means for determining determines the user's inputting is received;

a means for sending the first operation result obtained by the second means for obtaining to the smart key device.

Preferably the second means for determining is further configured to determine whether the triggering information is received from the user;

the second means for receiving is further configured to receive the triggering information from the user;

the second means for determining is further configured to determine whether there is any smart key device which is connected to the upper computer when the second means for receiving receives the triggering information from the user; and determine whether a matching code input by the user is received when there is the smart key device connected to the upper computer;

the second means for determining is further configured to determine whether the matching code is correct when the matching code input by the user is received;

the second means for sending is further configured to send a connecting request when the second means for determining determines that there is not any smart key device which is connected to the upper computer;

the first means for receiving is further configured to receive the connecting request sent from the upper computer;

the first means for generating is further configured to generate a connecting response when the first means for receiving receives the connecting request sent from the upper computer;

the first means for returning is further configured to return the connecting response to the upper computer when the first means for generating generates the connecting response;

the second means for receiving is further configured to receive the connecting response returned from the smart key device;

the second means for determining is further configured to determine whether the upper computer connects to the smart key device successfully according to the connecting response received by the second means for receiving;

the second means for sending is further configured to send the matching request to the smart key device when the second means for determining determines the upper computer connects to the smart key device unsuccessfully;

the second means for displaying is further configured to prompt the user to input the matching code when the second means for sending sends the matching request to the smart key device;

the second means for determining is further configured to determine whether the matching code is correct when the upper computer receives the matching code input by the user;

the upper computer further includes a second means for generating the request for verifying the password when the second means for determining determines the matching code input by the user is correct; and the second means for displaying is further configured to prompt the matching code is incorrect when the second means for determining determines the matching code input by the user is incorrect.

Preferably, the first means for generating is specifically configured to generate and display a random figure which includes characters shown for the user to input when the first means for receiving receives the request for verifying the password sent from the upper computer; or the first means for generating is specifically configured to generate and display a preset figure which includes characters arranged randomly and is shown for the user to input when the first means for receiving receives the request for verifying the password sent from the upper computer; or the first means for generating is specifically configured to generate and display the preset figure which includes random characters shown for the user to input when the first means for receiving receives the request for verifying the password sent from the upper computer.

Preferably, the second means for obtaining is specifically configured to obtain the first location identification of location corresponding to the user's inputting according to the user's inputting, operate hash algorithm on the first location identification so as to obtain the first operation result, and make the first operation result as the response for obtaining the password; and the second means for sending is further configured to send the first operation result obtained by the second means for obtaining to the smart key device.

Preferably, the first means for receiving is further configured to receive the response for obtaining the password sent from the upper computer so as to obtain the first operation result;

the smart key device further includes:

a first means for obtaining is configured to obtain the second location identification of location corresponding to the password code stored by the smart key device itself according to the password stored by the smart key device itself and characters arranged randomly, and make hash algorithm on the second location identification so as to obtain the second operation result; and the first means for determining is further configured to determine whether the first operation result is correct according to the second operation result.

Preferably, the second means for obtaining is specifically configured to obtain the first location identification of location corresponding to the user's inputting according to the user's inputting, and make the first location identification as the response for obtaining the password; and the second means for sending is configured to send the response for obtaining the password to the smart key device.

Preferably, the first means for receiving is further configured to receives the response for obtaining the password;

the first means for obtaining is further configured to obtain the first location identification, and join the first location identification in sequence so as to obtain the first operation result;

the first means for obtaining is further configured to obtain the second location identification of location corresponding to the user password stored by the smart key device itself according to the user password stored by the smart key device itself and characters arranged randomly, and join the second location identification in sequence so as to obtain the second operation result; and the first means for determining is further configured to determine whether the first operation result is the same as the second operation result.

Preferably, the second means for obtaining is further configured to obtain the first location identification of location corresponding to user's inputting according to the user's inputting, and join the first location identification in sequence so as to obtain the response for obtaining the password; and the second means for sending is further configured to send the response for obtaining the password to the smart key device.

Preferably, the first means for receiving is further configured to receive the response for obtaining the password;

the first means for generating is further configured to divide and intercept each first location identification from the response for obtaining the password, and confirm the password input by the user according to the first location identification; and the first means for determining is further configured to determine whether the password input by the user is the same as the password stored by itself.

According to present invention, any user always needs to click buttons located in different places whenever inputting any secret code; and the input password is not shown on a screen of the upper computer, therefore, the user's digital asset become safer.

PREFERRED EMBODIMENTS FOR CARRYING OUT THE INVENTION

The technical solutions in the Embodiments of the present invention are further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

In Embodiments of the present invention, an upper computer means a device with a displaying screen, such as a mobile phone or a computer, the upper computer connects to a smart key device via Bluetooth, audio or cable.

Embodiment 1

Figure 1:
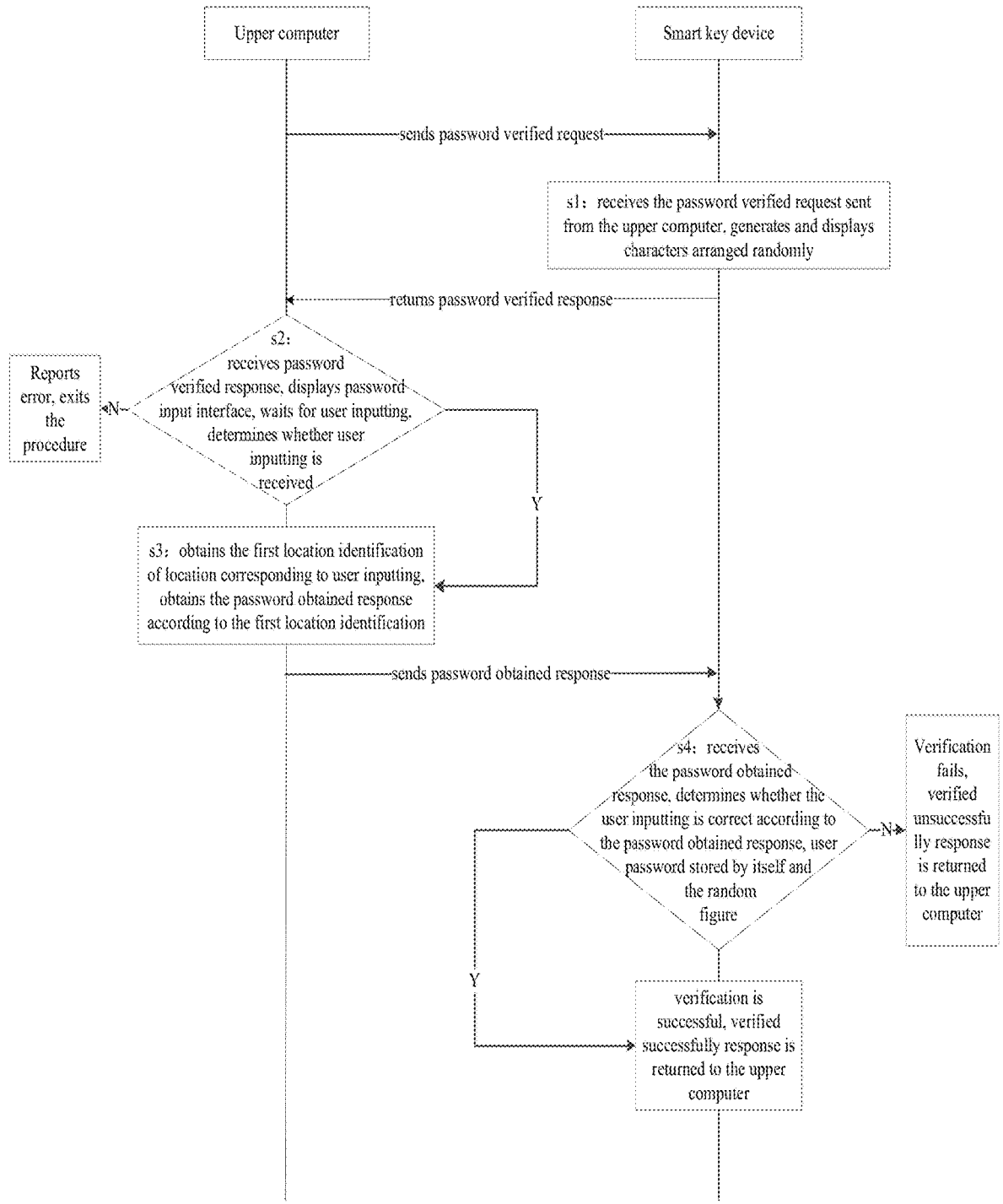
FIG. 1 is a flow chart of a method for inputting a password securely according to Embodiment 1 of the present invention.

As shown in FIG. 1, Embodiment 1 provides a method for inputting a password securely, including step s1, a smart key device receives a key verified request (a request for verifying a key) from an upper computer, generates and displays characters arranged randomly, and returns a key verified response to the upper computer;

step s2, the upper computer receives the key verified response, displays an interface for inputting password, and waits for inputting from a user, and determines whether the inputting is received, if yes, executes step s3; otherwise, reports an error, and exits from the procedure;

step s3, the upper computer obtains a first location identification of a corresponding location according to a user's inputting (an input from a user), obtains a password obtaining response (a response for obtaining a password) according to the first location identification, and sends the password obtaining response to the smart key device; and step s4, the smart key device receives the password obtaining response, determines whether the user's inputting is correct according to the password obtaining response, a password stored by itself and the characters arranged randomly, if yes, the verification is successful, and a verification successful response is returned to the upper computer; otherwise, the verification fails, and a verification unsuccessful response is returned to the upper computer.

Preferably, before step s1, the method further includes:

step s1-1, the upper computer waits for receiving user triggering information (information for triggering from the user), determines whether the user triggering information is received, if yes, executes step s1-2, otherwise, returns to step s1-1, step s1-2, the upper computer determines whether there is any smart key device which is connected to the upper computer, if yes, executes step s1-6, otherwise, executes step s1-3;

step s1-3, the upper computer sends a connecting request (a request for connecting the upper computer);

step s1-4, the smart key device receives the connecting request, and generates a connecting response, and returns the connecting response to the upper computer;

step s1-5, the upper computer receives the connecting response, and determines whether connection between the upper computer and the smart key device is successful according to the connecting response, if yes, executes step s1-6, otherwise, returns to step s1-3;

step s1-6, the upper computer determines whether it matches with the smart key device successfully, if yes, executes step s1; otherwise, sends a matching request to the smart key device, and prompts the user to input a matching code, and executes step s1-7, and step s1-7, the upper computer determines whether the matching code input by the user is received, if yes, determines whether the matching code is correct, generates a password verified request and sends the password verified request to the smart key device if the matching code is correct; prompts the matching code is incorrect and waits for the user inputting the matching code, and returns to step s1-7 if the matching code is incorrect; otherwise, exits from and ends the procedure.

Preferably, the user triggering information specifically is an interactive signing request.

Preferably, generating and displaying the characters arranged randomly in step s1 specifically is generating and displaying a random figure which includes characters which is used by the user; or generating and displaying the characters arranged randomly specifically is generating and displaying a preset figure which includes the characters which is used by the user; or generating and displaying the characters arranged randomly specifically is generating and displaying a preset picture which comprises random characters for the user to input.

Preferably, displaying the password inputted interface in step s2 specifically is that displaying a figure which is the same as the figure displayed on the smart key device, the figure displayed on the upper computer does not include the characters arranged randomly.

Preferably, after step s4, the method further includes:

the upper computer receives the verification response returned from the smart key device, determines a type of the verification response, and sends the interactive signing request to the smart key device if the verification response is a password verified successfully response; and the smart key device receives the interactive signing request sent from the upper computer, parses the interactive signing request to obtain the first interactive data, signs on the first interactive data to generate an interactive signing response, and returns the interactive signing response to the upper computer.

Preferably, the method further includes: the upper computer obtains the second interactive data according to the interactive signing response when receiving the interactive signing response returned from the smart key device, and generates a broadcast request according to the second interactive data, sends the broadcast request to the server, and determines whether a response is received from the server, if yes, the interaction is successful, the procedure is ended; otherwise, reports error, and ends the procedure.

Preferably, step s3 specifically comprises:

the upper computer obtains the first location identification corresponding to the location which is input by the user according to user's inputting, operates hash algorithm on the first location identification to obtain a first operation result, makes the first operation result as the password obtained response, and sends the password obtained response to the smart key device.

Preferably, step s4 specifically includes:

the smart key device obtains the password obtained response, obtains the first operation result, and obtains the second location identification of location corresponding to the user's password which is stored in itself according to the user's password stored by itself and the characters arranged randomly, operates hash algorithm on the second location identification to obtain the second operation result, and determines whether the first operation result is correct according to the second operation result, if yes, the verification is successful; otherwise, the verification fails.

Preferably, step s3 specifically comprises:

the upper computer obtains the first location identification of location corresponding to the user's inputting according to the user's inputting, makes the first location identification as the password obtained response, and sends the password obtained response to the smart key device.

Preferably, step s4 specifically includes:

the smart key device receives the password obtained response, divides and extracts the password to obtain each first location identification from the response, confirms the password input by the user according to the first location identification, and determines whether the password input by the user is the same as the password stored by itself, if yes, the verification is successful; otherwise, the verification fails.

Preferably, step s3 specifically comprises:

the upper computer obtains the first location identification of location corresponding to the user's inputting according to the user's inputting, joins the first location identification in sequence, and sends the response for obtaining the password to the smart key device.

Preferably, step s4 specifically includes:

the smart key device receives the response for obtaining the password, divides and extracts the password to obtain each first location identification from the response, confirms a password input by the user according to the first location identification, and determines whether the password input by the user is the same as a password stored by the smart key device itself, if yes, a verification is successful; otherwise, the verification is failed.

Embodiment 2

Figure 2:
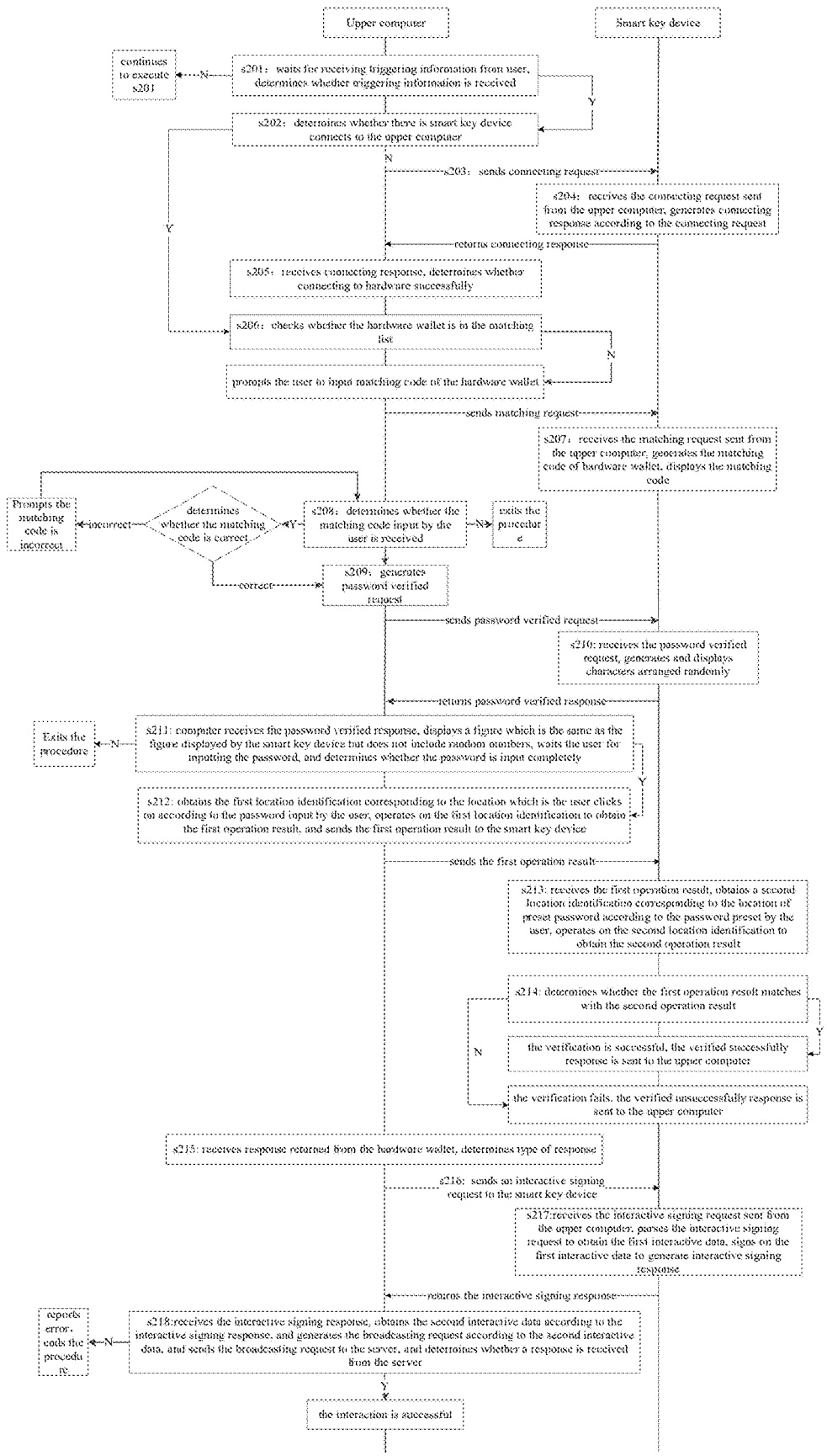
FIG. 2 is a flow chart of a method for inputting a password securely according to Embodiment 2 of the present invention.

According to Embodiment 2 of the present invention, it provides a method for inputting a password securely, as shown in FIG. 2, including:

step s201, an upper computer waits for receiving triggering information from a user, and determines whether the triggering information is received from the user, if yes, executes step s202; otherwise, continues to wait for receiving any information.

Preferably, in Embodiment 2, the triggering information from user is a signing request by using private key.

step s202, an upper computer determines whether there is a smart key device which is connects to the upper computer, if yes, executes step s206; otherwise, executes step s203.

Preferably, the upper computer can connect to the smart key device via Bluetooth or cable; in Embodiment 2, the upper computer connects to the smart key device via Bluetooth.

Preferably, step s202 specifically includes that the upper computer reads parameter of Bluetooth module of the upper computer, determines whether the parameter of Bluetooth module is read successfully, if yes, the upper computer connects to the smart key device successfully, executes step s206; otherwise, the upper computer cannot connect to the smart key device, and executes step s203.

step s203, the upper computer sends a connecting request to the smart key device.

step s204, the smart key device receives the connecting request sent from the upper computer, generates a connecting response according to the connecting request, and returns the connecting response to the upper computer.

Figure 3:
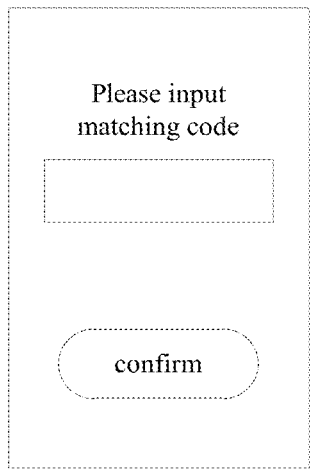
FIG. 3 is a diagrammatic drawing of inputting a match code displayed by an upper computer when a smart key device matches with the upper computer according to Embodiment 2.
Figure 4:
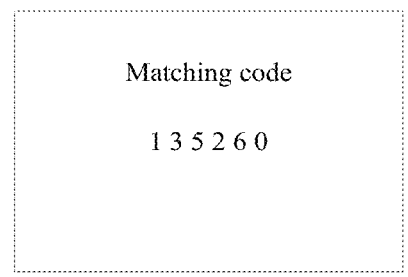
FIG. 4 is a diagrammatic drawing of a match code displayed on a smart key device when the smart key device matches with an upper computer.

Preferably, step s204 specifically includes:

step s204-1, the smart key device receives the connecting request sent from the upper computer, parses the connecting request to obtain terminal information of upper computer, checks a white list stored by the smart key device, and determines whether the white list is null, if yes, connects to the upper computer, returns connecting successfully response to the upper computer; otherwise, executes step s204-2; and step s204-2 the smart key device determines whether there is terminal information which is the same as the terminal information of upper computer which is obtained in the white list, if yes, connects to the upper computer, and returns the connecting successfully response to the upper computer; otherwise, rejects to connect to the upper computer, and returns connecting unsuccessfully response to the upper computer.

step s205, the upper computer receives a connecting response, determines whether it connects to the smart key device successfully, if yes, executes step s206; otherwise, returns to step s203.

step s206, the upper computer checks whether the smart key device is in a matching list, if yes, executes step s209; otherwise, sends the matching request to the smart key device, prompts the user to input the matching code of smart key device, and executes step s207;

for instance, the upper computer sends the matching request to the smart key device, and displays a figure for prompting user to input the matching code of smart key device in screen of upper computer as shown in FIG. 3.

step s207, the smart key device receives the matching request sent from the upper computer, generates the matching code of smart key device, and displays the matching code of smart key device; in which, the Bluetooth of smart key device is started;

for instance, the smart key device displays the matching code, as shown in FIG. 4.

step s208, the upper computer determines whether the matching code input by the user is received, if yes, determines whether the matching code input by the user is correct, the match is successful and if the matching code is correct, step s209 is executed; prompts the user the matching code is incorrect if the matching code is not correct, step s208 is executed; otherwise, exits the procedure.

Preferably, in the case that the upper computer determines the matching code input by the user is not received, before exiting the procedure, the method further includes:

the upper computer determines whether waiting time is longer than the first preset duration, if yes, exits the procedure; otherwise, continues to execute step s208;

for instance, the upper computer determines whether the waiting time is longer than 2 min, if yes, exits the procedure; otherwise, continues to execute step 208.

step s209, the upper computer generates a password verified request, and sends the encrypted password verified request to the smart key device;

for instance, the upper computer generates the password verified request 00290000, and sends the password verified request 00290000 to the smart key device;

in which, 00290000 is APDU message.

step s210, the smart key device receives the password verified request, generates and displays characters arranged randomly, and returns a password verified response to the upper computer.

Preferably, generating and displaying the characters arranged randomly specifically is generating and displaying a random figure which includes characters which is used by a user to input password.

Preferably, generating and displaying the characters arranged randomly specifically is generating and displaying a preset figure which includes characters arranged randomly which is used by the user to input password.

Preferably, generating and displaying the characters arranged randomly specifically is generating and displaying a preset figure which includes random characters which is used by the user to input password.

Figure 5:
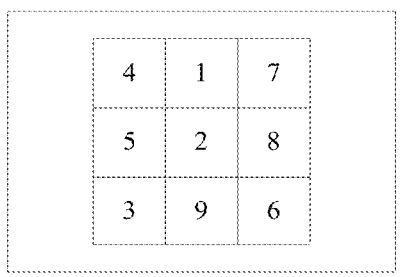
FIG. 5 is a diagrammatic drawing of a Sudoku with numbers displayed on a smart key device according to Embodiment 2 of the present invention.

For instance, the smart key device receives the password verified request, generates a group random numbers which is from 1 to 9, and the number is displayed randomly as a figure of Sudoku in the screen, as shown in FIG. 5, and the password verified response is returned to the upper computer.

Preferably, the smart key device generates and shows a random picture which contains random numbers, in which preferably, the password is preset by the user and is stored in the smart key device.

The smart key device generates a random figure, stores location identification of each location in the random figure into the identification list, in the case that the password verified request is received, all of numbers which are used by the user to input correspond randomly the location identification in the identification list one by one.

Preferably, the random figured generated by the smart key device is the preset figure.

step s211, the upper computer receives the password verified response, displays a figure which is the same as the figure displayed by the smart key device but does not include random numbers, waits the user for inputting the password, and determines whether the password is input completely, if yes, executes step s212; otherwise, exits the procedure and ends the procedure.

Preferably, the upper computer determines whether the user clicks on enter key, if yes, the user input complete password; otherwise, the user does not input the password completely.

Preferably, in the case that the user does not input the password completely in step s211, before exiting the procedure, the method further includes:

the upper computer determines whether the time for the user inputting the password completely is longer than a second preset duration, if yes, exits the procedure, and ends the procedure; otherwise, continues to wait the user for inputting the password;

for instance, the second preset duration is 2 minutes.

Figure 6:
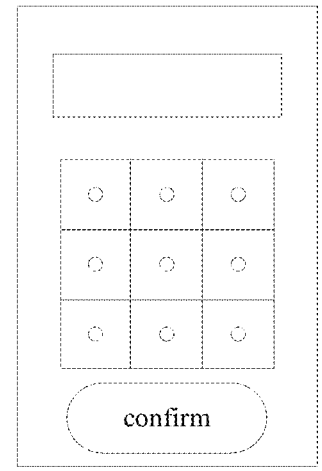
FIG. 6 is a diagrammatic drawing of a diagram with password input by a user when an upper computer receives the first response according to Embodiment 2 of the present invention.

For instance, the upper computer receives the password verified response, displays the figure which is the same as the figure displayed in the smart key device but does not includes numbers or characters, as shown in FIG. 6, and waits the user for inputting the password, and determines whether the password is received, if yes, executes step s212; otherwise, exits the procedure and ends the procedure.

step s212, the upper computer obtains the first location identification corresponding to the location which is the user clicks on according to the password input by the user, operates on the first location identification to obtain the first operation result, and sends the first operation result to the smart key device.

Preferably, step s212 specifically is that the upper computer obtains the first location identification corresponding to the location which the user clicks on according to the password input by the user, operates hash algorithm on the first location identification to obtain the first operation result, and sends the first operation result to the smart key device.

For instance, the password input by the user in the upper computer is 123456, the first location identification corresponding to the location is 258963, the upper operates the hash algorithm on the first location identification to obtain the first operation result which is 2680d8152dabba84c80a50e98afbcd84885b01a67ae276fdb1807fb3cfa66abb, and sends the first operation result to the smart key device.

step s213, the smart key device receives the first operation result, obtains a second location identification corresponding to the location of preset password according to the password preset by the user, operates on the second location identification to obtain the second operation result.

Preferably, step s213 specifically is that the smart key device receives the first operation result, obtains the second location identification corresponding the location according to the password preset by the user, operates hash algorithm on the second location identification to obtain the second operation result.

For instance, the password preset by the user is 123456, the second location identification corresponding to the location according to the password preset by the user is 258963, the smart key device operates the hash algorithm on the second location identification to obtain the second operation result which is 2680d8152dabba84c80a50e98afbcd84885b01a67ae276fdb1807fb3cfa66abb.

step s214, the smart key device determines whether the first operation result matches with the second operation result, if yes, the verification is successful, the verified successfully response is sent to the upper computer; otherwise, the verification fails, the verified unsuccessfully response is sent to the upper computer.

Preferably, step s214 specifically is that the smart key device determines whether the first operation result is the same as the second operation result, if yes, the verification is successful, the verified successful response is sent to the upper computer; otherwise, the verification fails, the verified unsuccessful response is sent to the upper computer, the procedure is ended.

For instance, the smart key device determines the first operation result which is 2680d8152dabba84c80a50e98afbcd84885b01a67ae276fdb1807fb3cfa66abb is the same as the second operation result which is 2680d8152dabba84c80a50e98afbcd84885b01a67ae276fdb1807fb3cfa66abb, if yes, the verification is successful, the verified successful response is sent to the upper computer; otherwise, the verification fails, the verified unsuccessful response is sent to the upper computer, the procedure is ended.

step s215, the upper computer receives the response returned from the smart key device, determines a type of the response, executes step s216 if the response is the verified successful response; prompts the user that the password is incorrect and exits the procedure if the response is the verified unsuccessful response.

Preferably, in step s215, in the case that the upper computer determines that the response returned from the smart key device is the verified unsuccessful response, before prompting the user that the password is incorrect and exiting the procedure, the method further includes:

the upper computer determines whether the number of times for inputting incorrect password by the user reaches the threshold value, if yes, exits the procedure; otherwise, continues to prompt the user to input password.

Preferably, the said upper computer determining whether the number of times for inputting incorrect password by the user reaches the threshold value specifically includes:

step a, the upper computer sends obtaining times for user retrying password request to the smart key device;

step b, the smart key device receives the obtaining times for user retrying password request, obtains the times for retrying password from the storage area of the smart key device, and determines whether the times for retrying password is 0, if not, returns the times for retrying password to the upper computer; if yes, returns smart key device locked response to the upper computer, and exits the procedure; and step c, the upper computer receives the result returned from the smart key device, determines the type of the result, continues to prompt the user to input password if the result is the times for retrying password; and exists the procedure if the result is the smart key device locked response.

step s216, the upper computer sends an interactive signing request to the smart key device.

Preferably, the interactive signing request includes interactive data.

Specifically, the interactive data includes interactive data of last time, account address and interactive sum, in which the interactive data of last time specifically is interactive HASH value of last time.

In Embodiment 2, the received interactive data specifically is 0X 01000000 01c9f3b07ebfca68 fd1a6339d0808fbb013c90c6095fc93901ea77410103489ab7 00000000 ffffffff 01 00bd0105000000 00 1976a9 14 634228c 26cf40a02a05db93f2f98b768a8e0e61b 88ac 00000000, in which data on bytes from the sixth byte to the thirty seventh byte which is 0X c9f3b07ebfca68fd 1a6339d0808fbb013c90c6095fc93901ea77 410103489ab7 is the active data of last time; data on bytes from the forty seventh byte to the fifty fourth byte which is 0X 00bd010500000000 is the interactive sum; data on bytes from the fifty ninth byte to the seventy eighth byte which is 0X 634228c26cf40a02a05db93f2f98b768a8e0e61b is the account address.

step s217, the smart key device receives the interactive signing request sent from the upper computer, parses the interactive signing request to obtain the first interactive data, signs on the first interactive data to generate interactive signing response, and returns the interactive signing response.

Preferably, the smart key device signs on the first interactive data according to the private key to generate the signing interactive response.

Specifically, the private key signs on the first interactive data via Elliptic Curve Digital Signature Algorithm, for instance, in Embodiment 2, the sub-private key of 256 bit which is 0X 6c5544797a91115dc3330ebd003851d239a706ff2aa2ab7003 9c5510ddf06420 signs on the interactive data which is 0X 0100000001c9f3b07ebfca68fd1a6339d0808fbb013c90c60 95fc93901 ea77410103489ab70000000001ffffffff0100bd01050000000 01976a914634228c26cf40a02a05 db93f2f98b768a8e0e61b88ac00000000 via Elliptic Curve Digital Signature Algorithm to obtain the signing result which is 0X 048aefd78bba80e2d1686225b755dacea890c9ca1be10ec98 173d7d5f2fefbbf881 a6e918f3b051f8aaaa3fcc18bbf65097ce8d30d5a7e5ef8d100 5eaafd4b3fbe.

step s218, the upper computer receives the interactive signing response, obtains the second interactive data according to the interactive signing response, and generates the broadcasting request according to the second interactive data, and sends the broadcasting request to the server, and determines whether a response is received from the server, if yes, the interaction is successful, the procedure is ended; otherwise, error is reported, the procedure is exited.

Embodiment 3

Figure 7:
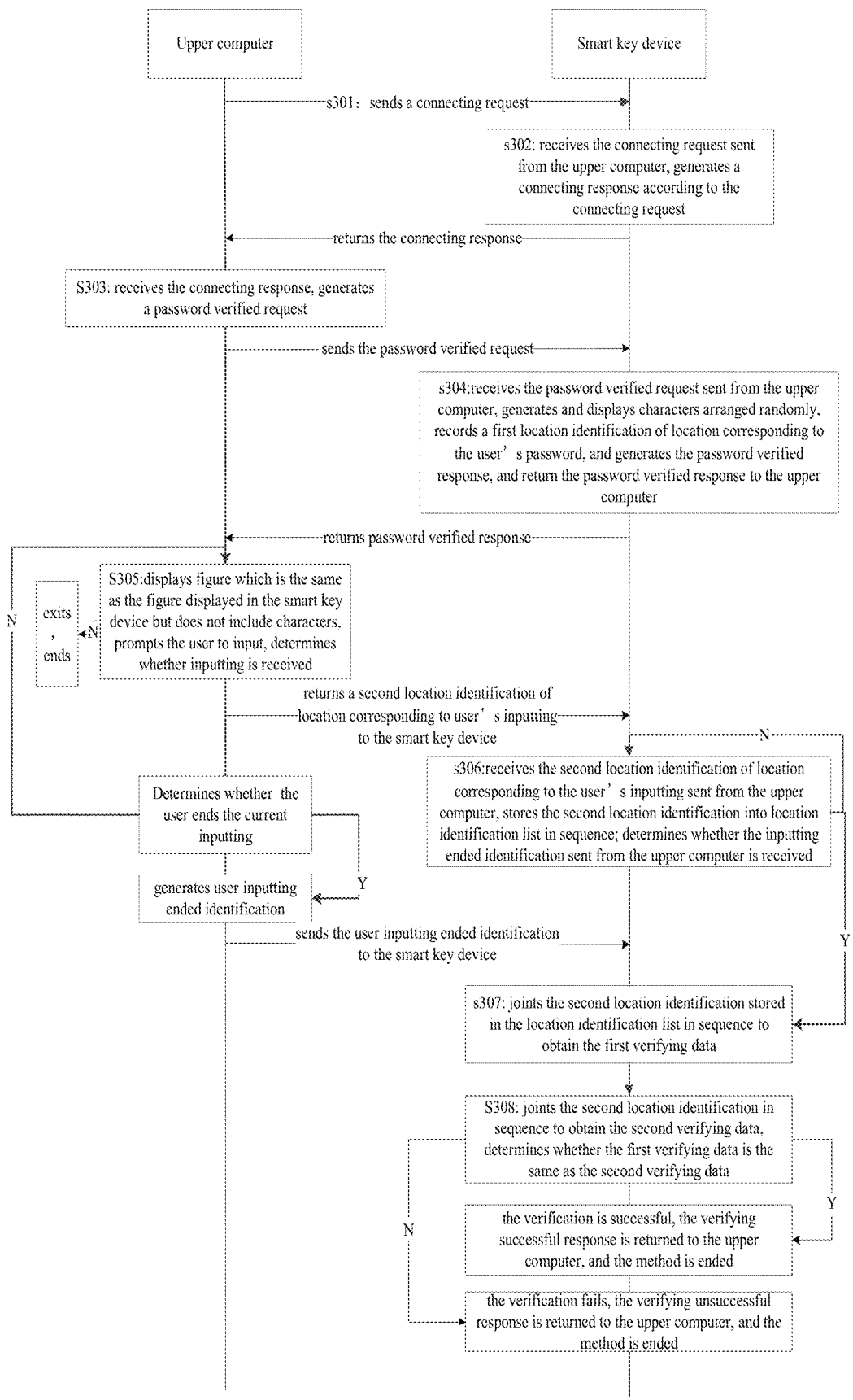
FIG. 7 is a flow diagram of a method for inputting a password securely according to Embodiment 3 of the present invention.

According to Embodiment 3, it provides a method for inputting a password securely, as shown in FIG. 7, including:

step s301, the upper computer sends a connecting request to the smart key device.

step 302, the smart key device receives the connecting request sent from the upper computer, generates a connecting response according to the connecting request, and returns the connecting response to the upper computer.

step 303, the upper computer receives the connecting response, generates a password verified request, and sends the password verified request to the smart key device.

step s304, the smart key device receives the password verified request sent from the upper computer, generates and displays characters arranged randomly, records a first location identification of location corresponding to the user's password, and generates the password verified response, and return the password verified response to the upper computer.

Preferably, generating and displaying the characters arranged randomly specifically is that generating and displaying a random figure which includes characters which is configured to be input by the user as the password.

Preferably, generating and displaying the characters arranged randomly specifically is that generating and displaying a preset figure which includes characters arranged randomly which used by the user as password.

Preferably, generating and displaying characters arranged randomly specifically is that generating and displaying the preset figure which includes random characters which is used by the user as password.

step s305, the upper computer displays figure which is the same as the figure displayed in the smart key device but does not include characters, prompts the user to input, determines whether inputting is received, if yes, returns a second location identification of location corresponding to user's inputting to the smart key device, and determines whether the user ends the current inputting, generates user inputting ended identification and sends the user inputting ended identification to the smart key device if the user ends the current inputting; and returns to step s305 if the user does not end the current inputting; otherwise, exits the procedure, and ends the procedure.

step s306, the smart key device receives the second location identification of location corresponding to the user's inputting sent from the upper computer, stores the second location identification into location identification list in sequence; determines whether the inputting ended identification sent from the upper computer is received, if yes, executes step s307; otherwise, executes step s306.

step s307, the smart key device joints the second location identification stored in the location identification list in sequence to obtain the first verifying data.

step s308, the smart key device joints the second location identification in sequence to obtain the second verifying data, determines whether the first verifying data is the same as the second verifying data, if yes, the verification is successful, the verifying successful response is returned to the upper computer, and the method is ended; otherwise, the verification fails, the verifying unsuccessful response is returned to the upper computer, and the method is ended.

Embodiment 4

Figure 8:
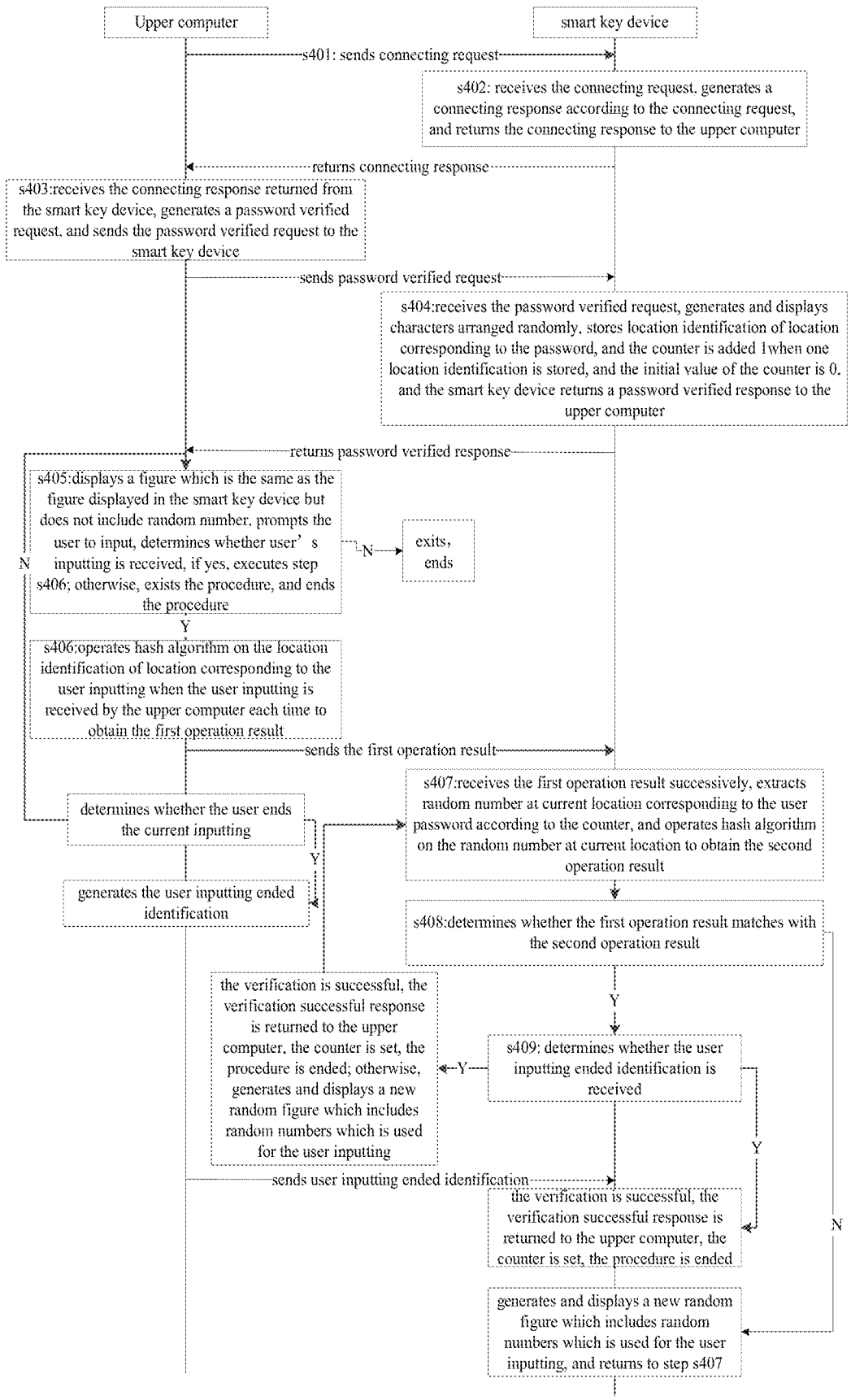
FIG. 8 is a flow diagram of a method for inputting a password securely according to Embodiment 4 of the present invention.

According to Embodiment 4, it provides a method for generating a password securely, as shown in FIG. 8, including:

step s401, an upper computer sends a connecting request to a smart key device;

step s402, the smart key device receives the connecting request, generates a connecting response according to the connecting request, and returns the connecting response to the upper computer;

step s403, the upper computer receives the connecting response returned from the smart key device, generates a password verified request, and sends the password verified request to the smart key device; and step s404, the smart key device receives the password verification request (password verifying request), generates and displays characters arranged randomly, and stores location identification of location corresponding to the password. At the same time, a counter is added 1 when one location identification is stored, in which the initial value of the counter is 0, and the smart key device returns a password verified response (password verifying response) to the upper computer.

Preferably, generating and displaying characters arranged randomly specifically is generating and displaying a random figure which includes characters which can be used as password input by the user.

Preferably, generating and displaying characters arranged randomly specifically is generating and displaying a preset figure which includes characters arranged randomly which can be used as password input by the user.

Preferably, generating and displaying characters arranged randomly specifically is generating and displaying a preset figure which includes random characters which can be used as password input by the user.

step s405, the upper computer displays a figure which is the same as the figure displayed in the smart key device but does not include random number, prompts the user to input, determines whether user's inputting is received, if yes, executes step s406; otherwise, exists the procedure, and ends the procedure.

step s406, the upper computer operates hash algorithm on the location identification of location corresponding to the user inputting when the user inputting is received by the upper computer each time to obtain the first operation result, and sends the first operation result to the smart key device, and determines whether the user ends the current inputting, if yes, generates the user inputting ended identification, and sends the user inputting ended identification; otherwise, returns to step s406.

step s407, the smart key device receives the first operation result successively, extracts random number at current location corresponding to the user password according to the counter, and operates hash algorithm on the random number at current location to obtain the second operation result.

step s408, the smart key device determines whether the first operation result matches with the second operation result, if yes, executes step s409; otherwise, the verification fails, the verification unsuccessful response is returned to the upper computer, the procedure is ended.

step s409, the smart key device determines whether the user inputting ended identification is received, if yes, the verification is successful, the verification successful response is returned to the upper computer, the counter is set, the procedure is ended; otherwise, generates and displays a new random figure which includes random numbers which is used for the user inputting, and returns to step s407.

Embodiment 5

Figure 9:
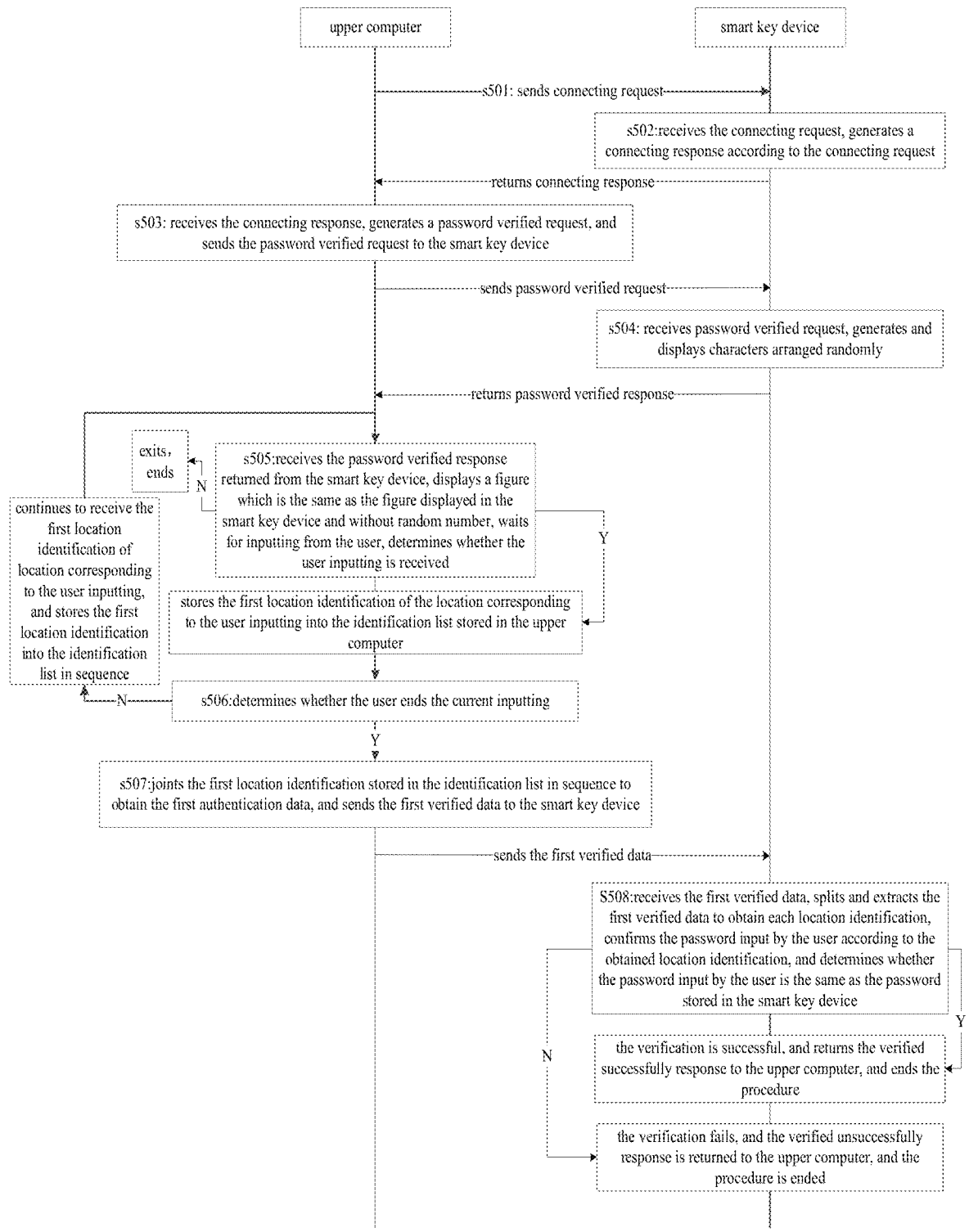
FIG. 9 is a flow diagram of a method for inputting a password securely according to Embodiment 5 of the present invention.
Figure 10:
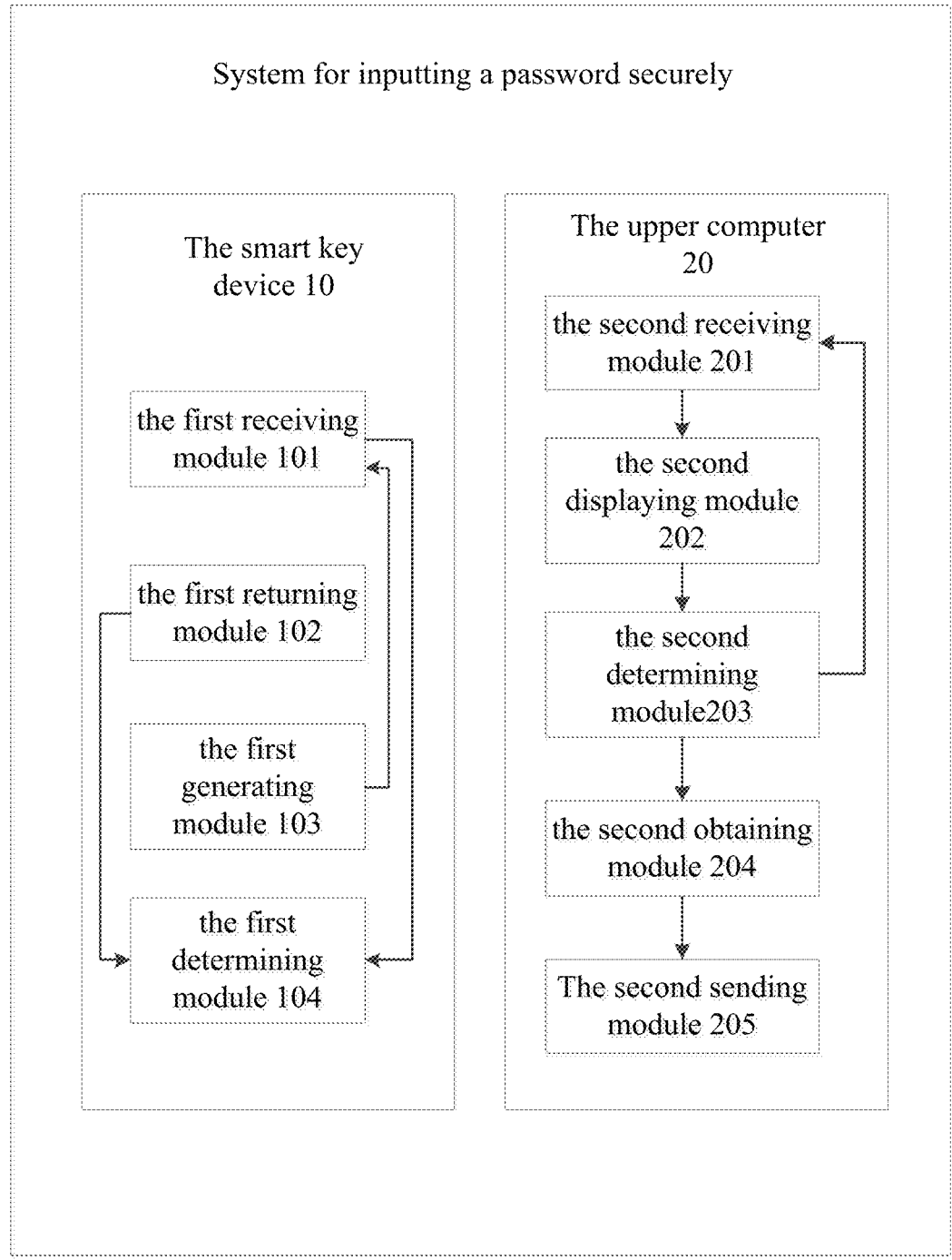
FIG. 10 is a block diagram of a system for inputting a password securely according to Embodiment 6 of the present invention.

According to Embodiment 5, it provides a method for inputting a password securely, as shown in FIG. 9, including:

step s501, an upper computer sends a connecting request to a smart key device.

step s502, the smart key device receives the connecting request, generates a connecting response according to the connecting request, and returns the connecting response to the upper computer.

step s503, the upper computer receives the connecting response, generates a password verified request, and sends the password verified request to the smart key device.

step s504, the smart key device receives the password verified request, generates and displays characters arranged randomly, and returns the password verified response to the upper computer.

Preferably, generating and displaying the characters arranged randomly specifically is that generating and displaying a random figure which includes characters which is used for user inputting a password.

Preferably, generating and displaying the characters arranged randomly specifically is that generating and displaying a preset figure which includes characters arranged randomly which is used for user inputting a password.

Preferably, generating and displaying characters arranged randomly specifically is that generating and displaying a preset figure which includes random characters which is used for user inputting a password.

step s505, the upper computer receives the password verified response returned from the smart key device, displays a figure which is the same as the figure displayed in the smart key device and without random number, waits for inputting from the user, determines whether the user inputting is received, if yes, stores the first location identification of the location corresponding to the user inputting into the identification list stored in the upper computer, and executes step s506; otherwise, exits the procedure, and ends the procedure.

step s506, the upper computer determines whether the user ends the current inputting, if yes, executes step s507; otherwise, continues to receive the first location identification of location corresponding to the user inputting, and stores the first location identification into the identification list in sequence, and returns to step s506.

step s507, the upper computer joints the first location identification stored in the identification list in sequence to obtain the first authentication data, and sends the first verified data to the smart key device.

step s508, the smart key device receives the first verified data, splits and extracts the first verified data to obtain each location identification, confirms the password input by the user according to the obtained location identification, and determines whether the password input by the user is the same as the password stored in the smart key device, if yes, the verification is successful, and returns the verified successfully response to the upper computer, and ends the procedure; otherwise, the verification fails, and the verified unsuccessfully response is returned to the upper computer, and the procedure is ended.

Embodiment 6

According to Embodiment 6 of the present disclosure, it provides a system for inputting a password securely including a smart key device 10 and an upper computer 20.

The smart key device 10 includes:
a first receiving module 101 which is configured to receive a password verified request from an upper computer;
a first returning module 102 which is configured to return a password verified response to the upper computer 20;
a first generating module 103 which is configured to generate a random character string when the first receiving module 101 receives the password verified request sent from the upper computer 20;
the first receiving module 101 is further configured to receive a first operation result sent from the upper computer 20;
a first determining module 104 which is configured to determine whether the user inputting is correct according to the first operation result, the password stored by itself and the random character string generated by the first generating module 103 when the first receiving module 101 receives the first operation result;
the first returning module 102 is further configured to return the verified successfully response to the upper computer 20; and the upper computer 20 includes:
a second receiving module 201 which is configured to receive a password verified response returned from the smart key device 10;
a second displaying module 202 which is configured to display a password input interface and wait for inputting from a user when the second receiving module 201 receives the password verified response;
a second determining module 203 which is configured to determine whether the user inputting is received when the second displaying module 202 displays the password input interface;
a second obtaining module 204 which is configured to obtain the first location identification of corresponding location, and operate on the first location identification to obtain a first operation result when the second determining module 203 determines the user inputting is received; and
a second sending module 205 which is configured to send the first operation result obtained by the second obtaining module 204 to the smart key device 10.

Preferably, the second determining module 203 is further configured to determine whether triggering information is received from the user;
the second receiving module 201 if further configured to receive the triggering information from the user;
the second determining module 203 is further configured to determine whether there is a smart key device connected when the second receiving module 201 receives the triggering information from the user; and determine whether a matching code input by the user is received when there is the smart key device connected;
the second determining module 203 is further configured to determine whether the matching code is correct when the matching code input by the user is received;
the second sending module 205 is further configured to send a connecting request when the second determining module 203 determines there is not the smart key device connected to the upper computer;
the first receiving module 101 is further configured to receive the connecting request sent from the upper computer 20;
the first generating module 103 is further configured to generate a connecting response when the first receiving module 101 receives the connecting request sent from the upper computer 20;
the first returning module 102 is further configured to return the connecting response to the upper computer 20 when the first generating module 103 generates the connecting response;
the second receiving module 201 is further configured to receive the connecting response returned from the smart key device 10;
the second determining module 203 is further configured to determine whether the upper computer 20 connects to the smart key device 10 successfully according to the connecting response received by the second receiving module 201;
the second sending module 205 is further configured to send the matching request to the smart key device 10 when the second determining module 203 determines the upper computer 20 connects to the smart key device 10 unsuccessfully;
the second displaying module 202 is further configured to prompt the user to input the matching code when the second sending module 205 sends the matching request to the smart key device 10;
the second determining module 203 is further configured to determine whether the matching code is correct when the upper computer 20 receives the matching code input by the user;
the upper computer further includes a second generating module which is configured to generate a password verified request when the second determining module 203 determines the matching code input by the user is correct;
the second displaying module 202 is further configured to prompt the matching code is incorrect when the second determining module 203 determines the matching code input by the user is not correct.

Preferably, the triggering information received by the second receiving module 201 from the user is an interactive signing request.

Preferably, the smart key device 10 further includes:
a first displaying module which is configured to display the random character string in a preset figure in the smart key device 10 after the first generating module 103 generates the random character string.

Preferably, the second displaying module 202 is specifically configured to display the preset figure which is the same as the figure displayed in the smart key device 10, but the figure does not include the random characters.

Preferably, the second receiving module 201 is further configured to receive the verifying response returned from the smart key device 10;
the second determining module 203 is further configured to determine a type of the verifying response when the second receiving module 201 receives the verifying response;
the second sending module 205 is further configured to send the interactive signing request to the smart key device 10 when the second determining module 203 determines the verifying response is the password verified successful response;
the first receiving module 101 receives the interactive signing request sent from the upper computer.

The smart key device further includes:
a parsing module which is configured to parse the interactive signing request to obtain a first interactive data when the first receiving module 101 receives the interactive signing request;
the first generating module 103 is further configured to sign on the first interactive data to generate an interactive signing response; and
the first returning module 102 is configured to return the interactive signing response generated by the first generating module 103 to the upper computer.

Preferably, the second receiving module 201 is further configured to receive the verifying response returned from the smart key device 10;
the second generating module is further configured to obtain a second interactive data according to the interactive signing response and to generate a broadcasting request according to the second interactive data when the second receiving module 201 receives the interactive signing response;
the second sending module 205 is further configured to send the broadcasting request generated by the second generating module to the server; and
the second determining module 203 is further configured to determine whether a response returned from the server is received.

Preferably, the second obtaining module 204 is specifically configured to operate hash algorithm on the first location identification to obtain the first operation result.

Preferably, the first receiving module 101 is further configured to receive the first operation result sent from the upper computer 20.

The smart key device further includes:
a first obtaining module is configured to obtain the second location identification of location corresponding to the password which is stored by itself according to the password stored by itself and the random character string, and operate hash algorithm on the second location identification to obtain the second operation result;

the first determining module 104 is further configured to determine whether the first operation result is correct according to the second operation result.

Preferably, the second obtaining module 204 is specifically configured to join the first location identification in sequence to obtain a first verified data, and make the first verified data as the first operation result.

Preferably, the first receiving module 101 is further configured to receive the first operation result;
the first obtaining is further configured to divide and intercept each location identification from the first operation result; and
the first determining module 104 is further configured to confirm the password input by the user according to the location identification, and to determine whether the password input by the user is correct according to the password stored by itself and the random character string.

The technical solutions in the Embodiments of the present invention have been described clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

The invention claimed is:

1. A method for inputting a password securely, wherein said method comprises the following steps:
s1) receiving, by a smart key device, a password verified request sent from an upper computer, generating characters arranged randomly and displaying the characters to a user in the screen of the smart key device, and returning a password verified response to the upper computer;
s2) receiving, by the upper computer, the password verified response, displaying a password input interface, waiting for the user inputting, and determining whether the user inputting is received, if yes, executing step s3; otherwise, reporting an error, and ending;
s3) obtaining, by the upper computer, a first location identification of corresponding location according to the user inputting, and obtaining a password obtained response according to the first location identification, and sending the password obtained response to the smart key device; and
s4) receiving, by the smart key device, the password obtained response, and determining whether the user inputting is correct according to the password obtained response, a password stored by itself and the characters arranged randomly, if yes, a verification is successful, the smart key device returning a verified successfully response to the upper computer; otherwise, the verification fails, the smart key device returning a verified unsuccessfully response to the upper computer.

2. The method as claimed in claim 1, wherein, before step s1, said method comprises the following steps:
s1-1) waiting for, by the upper computer, receiving triggering information from a user, and determining whether the triggering information is received from the user, if yes, executing step s1-2; otherwise, returning to step s1-1;
s1-2) determining, by the upper computer, whether there is a smart key device which is connected to the upper computer, if yes, executing step s1-6; otherwise, executing step s1-3;

s1-3) sending, by the upper computer, a connecting request to the upper computer;

s1-4) receiving, by the smart key device, the connecting request, generating a connecting response, and returning the connecting response to the upper computer;

s1-5) receiving, by the upper computer, the connecting response, and determining whether it connects to the smart key device successfully according to the connecting response, if yes, executing step s1-6; otherwise, returning to step s1-3;

s1-6) determining, by the upper computer, whether it matches with the smart key device successfully, if yes, executing step s1; otherwise, sending a matching request to the smart key device, and prompting the user to input a matching code, and executing step s1-7; and s1-7) determining, by the upper computer, whether the matching code is received from the user, if yes, determining whether the matching code is correct, generating the password verified request and sending the password verified request to the smart key device if the matching code is correct; prompting the matching code is incorrect and waiting for the user to input the matching code and returning to step s1-7 if the matching code is incorrect; otherwise, exiting and ending the method.

3. The method as claimed in claim 1, wherein, generating and displaying characters arranged randomly in step s1 specifically is generating and displaying a random figure which includes characters which are used for the user to input; or generating and displaying characters arranged randomly specifically is generating and displaying a preset figure which includes characters arranged randomly and used for the user to input; or generating and displaying characters arranged randomly specifically is generating and displaying the preset figure which includes random characters which are used for the user to input.

4. The method as claimed in claim 1, wherein, step s3 specifically comprises obtaining, by the upper computer, the first location identification of location corresponding to the user inputting according to the user inputting, operating hash algorithm on the first location identification to obtain a first operation result, and making the first operation result as the password obtained response, and sending the password obtained response to the smart key device.

5. The method as claimed in claim 4, wherein, step s4 specifically comprises:

receiving, by the smart key device, the password obtained response, obtaining the first operation result, obtaining a second location identification of location corresponding to the user password stored by itself according to the user password stored by itself and the characters arranged randomly, operating hash algorithm on the second location identification to obtain the second operation result, and determining whether the first operation result is correct according to the second operation result, if yes, the verification is successful; otherwise, the verification fails.

6. The method as claimed in claim 1, wherein step s3 specifically comprises obtaining, by the upper computer, the first location identification of location corresponding to the user inputting according to the user inputting, and making the first location identification as the password obtained response, and sending the password obtained response to the smart key device.

7. The method as claimed in claim 6, wherein step s4 specifically comprises:

receiving, by the smart key device, the password obtained response, obtaining the first location identification, joining the first location identification in sequence to obtain the first operation result; obtaining the second location identification of location corresponding to the user password stored by itself according to the user password stored by itself and the characters arranged randomly, joining the second location identification in sequence to obtain the second operation result, and determining whether the first operation result is the same as the second operation result, if yes, the verification is successful; otherwise, the verification fails.

8. The method as claimed in claim 1, wherein step s3 specifically comprises obtaining, by the upper computer, the first location identification of location corresponding to the user inputting according to the user inputting, joining the first location identification in sequence to obtain the password obtained response, and sending the password obtained response to the smart key device.

9. The method as claimed in claim 8, wherein step s4 specifically comprises receiving, by the smart key device, the password obtained response, dividing and intercepting each first location identification from the password obtained response, confirming a password input by the user according to the first location identification, and determining whether the password input by the user is the same as the password stored by itself, if yes, the verification is successful; otherwise, the verification fails.

10. A system for inputting a password securely, wherein said system comprises a smart key device and an upper computer;

the smart key device comprises:

a first receiving module which is configured to receive a password verified request sent from the upper computer;

a first returning module which is configured to return a password verified response to the upper computer;

a first generating module which is configured to generate characters arranged randomly and displaying the characters to a user in the screen of the smart key device when the first receiving module receives the password verified request sent from the upper computer;

the first receiving module is further configured to receive a first operation result sent from the upper computer;

a first determining module which is configured to determine whether the user inputting is correct according to the first operation result, a password stored by itself, and the characters arranged randomly generated by the generating module in the case that the first receiving module receives the first operation result;

the first returning module is further configured to return the verified successfully response to the upper computer when the first determining module determines that the user inputting is correct; and to return a verified unsuccessfully response to the upper computer when the first determining module determines that the user inputting is incorrect;

the upper computer includes:
a second receiving module which is configured to receive the password verified response returned from the smart key device;
a second displaying module which is configured to display a password input interface and wait a user for inputting the password when the second receiving module receives the password verified response;
the second determining module which is configured to determine whether the user inputting is received when the second displaying module displays the password input interface;
a second obtaining module which is configured to obtain the first location identification of corresponding location, and operate on the first location identification so as to obtain the first operation result when the second determining module determines the user inputting is received;
a sending module which is configured to send the first operation result obtained by the second obtaining module to the smart key device.

11. The system as claimed in claim 10, wherein the second determining module is further configured to determine whether the triggering information is received from the user;
the second receiving module is further configured to receive the triggering information from the user;
the second determining module is further configured to determine whether there is any smart key device which is connected to the upper computer when the second receiving module receives the triggering information from the user; and determine whether a matching code input by the user is received when there is the smart key device connected to the upper computer;
the second determining module is further configured to determine whether the matching code is correct when the matching code input by the user is received;
the second sending module is further configured to send a connecting request when the second determining module determines that there is not any smart key device which is connected to the upper computer;
the first receiving module is further configured to receive the connecting request sent from the upper computer;
the first generating module is further configured to generate a connecting response when the first receiving module receives the connecting request sent from the upper computer;
the first returning module is further configured to return the connecting response to the upper computer when the first generating module generates the connecting response;
the second receiving module is further configured to receive the connecting response returned from the smart key device;
the second determining module is further configured to determine whether the upper computer connects to the smart key device successfully according to the connecting response received by the second receiving module;
the second sending module is further configured to send the matching request to the smart key device when the second determining module determines the upper computer connects to the smart key device unsuccessfully;
the second displaying module is further configured to prompt the user to input the matching code when the second sending module sends the matching request to the smart key device;
the second determining module is further configured to determine whether the matching code is correct when the upper computer receives the matching code input by the user;
the upper computer further includes a second generating module which is configured to generate the password verified request when the second determining module determines the matching code input by the user is correct; and
the second displaying module is further configured to prompt the matching code is incorrect when the second determining module determines the matching code input by the user is incorrect.

12. The system as claimed in claim 10, wherein the first generating module is specifically configured to generate and display a random figure which includes characters which is used for the user to input when the first receiving module receives the password verified request sent from the upper computer; or
the first generating module is specifically configured to generate and display a preset figure which includes characters arranged randomly and can be used for the user to input when the first receiving module receives the password verified request sent from the upper computer; or
the first generating module is specifically configured to generate and display the preset figure which includes random characters shown for the user to input when the first receiving module receives the password verified request sent from the upper computer.

13. The system as claimed in claim 10, wherein the second obtaining module is specifically configured to obtain the first location identification of location corresponding to the user inputting according to the user inputting, operate hash algorithm on the first location identification to obtain the first operation result, and make the first operation result as the password obtained response; and
the second sending module is further configured to send the first operation result obtained by the second obtaining module to the smart key device.

14. The system as claimed in claim 13, wherein
the first receiving module is further configured to receive the password obtained response sent from the upper computer so as to obtain the first operation result;
the smart key device further includes:
a first obtaining module which is configured to obtain the second location identification of location corresponding to the password code stored by itself according to the password stored by itself and the characters arranged randomly, and make hash algorithm on the second location identification so as to obtain the second operation result; and
the first determining module is further configured to determine whether the first operation result is correct according to the second operation result.

15. The system as claimed in claim 10, wherein the second obtaining module is specifically configured to obtain the first location identification of location corresponding to the user inputting according to the user inputting, and make the first location identification as the password obtained response; and
the second sending module is configured to send the password obtained response to the smart key device.

16. The system as claimed in claim 15, wherein
the first receiving module is further configured to receive the password obtained response;

the first obtaining module is further configured to obtain the first location identification, and join the first location identification in sequence so as to obtain the first operation result;

the first obtaining module is further configured to obtain the second location identification of location corresponding to the user password stored by itself according to the user password stored by itself and the characters arranged randomly, and join the second location identification in sequence so as to obtain the second operation result; and the first determining module is further configured to determine whether the first operation result is the same as the second operation result.

17. The system as claimed in claim 10, wherein the second obtaining module is further configured to obtain the first location identification of location corresponding to user inputting according to the user inputting, and join the first location identification in sequence so as to obtain the password obtained response; and the second sending module is further configured to send the password obtained response to the smart key device.

18. The system as claimed in claim 17, wherein the first receiving module is further configured to receive the password obtained response;

the first generating module is further configured to divide and intercept each first location identification from the password obtained response, and confirm the password input by the user according to the first location identification; and the first determining module is further configured to determine whether the password input by the user is the same as the password stored by itself.

* * * * *